Dec. 27, 1927.
N. ARCHIDIACANO
1,653,831
FRUIT AND VEGETABLE SQUEEZER
Filed Sept. 7, 1927
2 Sheets-Sheet 1
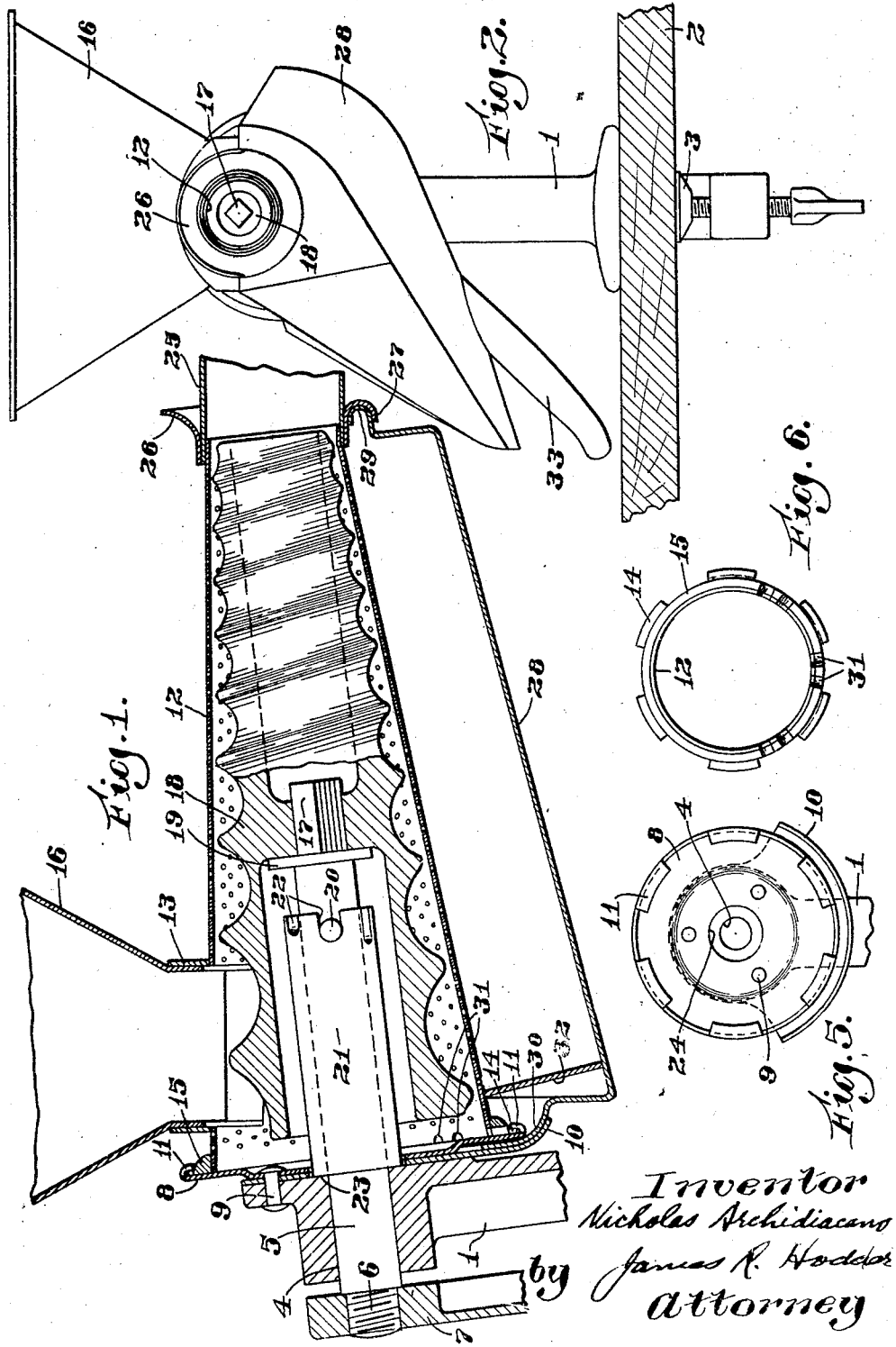
Inventor
Nicholas Archidiacano
by James R. Hodder
Attorney

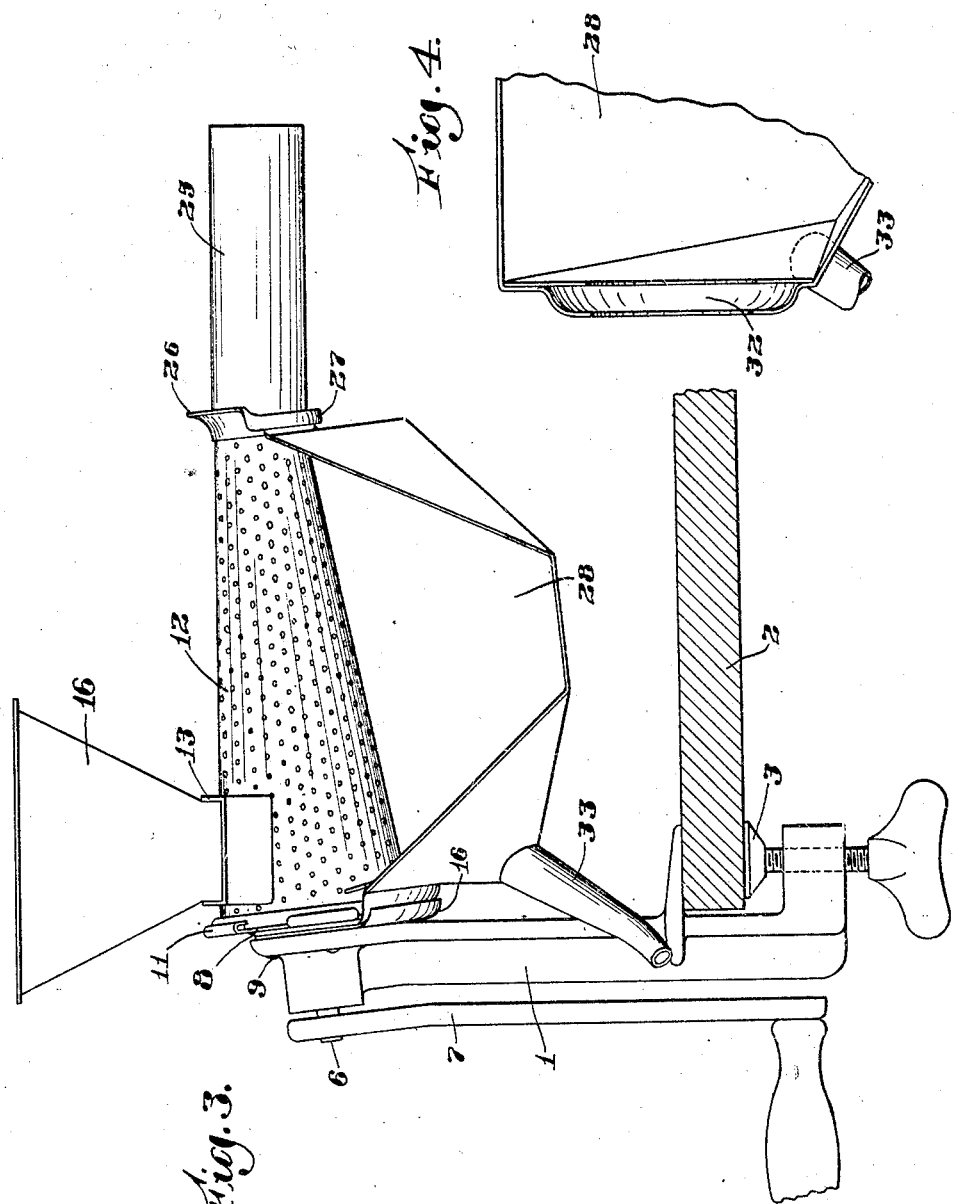

Patented Dec. 27, 1927.

1,653,831

UNITED STATES PATENT OFFICE.

NICHOLAS ARCHIDIACANO, OF BOSTON, MASSACHUSETTS.

FRUIT AND VEGETABLE SQUEEZER.

Application filed September 7, 1927. Serial No. 217,947.

My present invention relates to machines for squeezing tomatoes, or other vegetables and fruits, an important object of the invention being to provide a novel device for this purpose which is economical to manufacture and simple in operation.

A further object of the invention is to provide a conical screen within which a tapered worm or feed screw operates, and to also provide means for adjusting the position of the feed screw within the screen in order to facilitate the grinding or squeezing of articles having thick or thin skins, or depending on the degree of ripeness of the articles being operated upon. This is an important feature of the present invention, and by providing means to positively and mechanically adjust this feed screw, I obviate any difficulty arising from clogging of the machine by feeding vegetables or fruits of different consistencies thereto.

A further object of the invention is to provide means to separate the water content in the vegetables or fruit, from the pulp, the primary object of the present invention being to separate the pulp from the fruit or vegetables, in which event the water constituent of the same is not always desired.

Also, preferably, I position all the threads of the feed screw substantially equidistant from the interior of the conical screen, thus insuring an even passage of the articles therethrough, and an even and constant grinding or squeezing effect throughout the length of the machine.

Further features of the invention, details of construction, combinations of parts and advantages, will be hereinafter more fully pointed out and claimed.

Referring to the drawings, illustrating a preferred embodiment of the present invention, Fig. 1 is a longitudinal sectional view of the machine;

Fig. 2 is an end elevation of the machine;

Fig. 3 is a side elevation of the machine;

Fig. 4 is a partial plan view of the water separating end of the pulp receiving tray;

Fig. 5 is an end view of the machine before application of the shaft, feed screw and component parts; and Fig. 6 is an end view of the conical screen.

As shown in the drawings, a supporting bracket 1 adapted to be secured to a table or bench 2 by means of a clamping screw 3, is provided. The head of the bracket 1 is provided with a recess 4 through which a shaft 5 extends, this shaft being threaded on its outer end, as at 6, to receive a handle 7, correspondingly threaded. To the inner side of the head of the bracket 1 is affixed a plate 8 by means of rivets 9 or the like, and interposed between the plate 8 and the head of the bracket is a further plate 10, the lower portion of which is flared, as clearly shown in Fig. 1, the lower portion of the plate 8 being spaced from the flared portion of the plate 10, for a purpose to be hereinafter more fully described. Lips or ears 11 are provided at predetermined intervals throughout the periphery of the plate 8.

A conical screen is also provided, having an opening 13 therein and having, at spaced intervals throughout the periphery of its flange 15, a plurality of lugs or webs 14 adapted to be engaged under the lips 11 to secure the screen to the plate 8. Within the opening 13 in the screen 12 is adapted to be positioned a feeding hopper 16, to permit vegetables or fruits to be fed to the machine.

The shaft 5 extends inwardly into the screen and its outer end is squared, as at 17, and onto the squared end 17 is positioned a worm or tapered feed screw 18, abutting against a shoulder 19 on the shaft 5. A lug or boss 20 is formed or positioned on the shaft 5, and around the shaft 5 is positioned a sleeve 21 having a plurality of notches 22 in its outer end, and adapted to bear, on its inner end, against the face 23 of the head of the bracket 1, apertures 24 being provided in the plates 8 and 10 for this purpose. Each of the notches 22 are of different depth, varying approximately one-eighth of an inch from adjacent notches. When the sleeve is adjusted on the shaft 5 so that the shortest notch engages the lug 20, the threads of the feed screw will be in close proximity with the sides of the screen 12, thus permitting only fine skins, seeds, and the like to be ultimately discharged through the discharge opening or nozzle 25. If coarser fruits or vegetables are to be fed through the machine, the sleeve 21 will be adjusted to bring a deeper notch 22 into engagement with the lug 20, thus permitting the passage of coarser skins, seeds, and the like through the machine.

Surrounding the discharge nozzle 25 is a flange 26 having its lower portion inturned as shown at 27, and the pulp or juice receiving tray 28 is applied to the machine, its lip 29 engaging the inturned portion 27 of the flange 26, and its edge 30 being interposed in the space between the lower portions of the plates 10 and 8, as clearly shown. When in position, on a table, bench or the like, the top of the screen 12 is preferably substantially level, or parallel with the said table or bench. Thus, when fruits or vegetables, such as tomatoes, are fed to the machine for grinding and squeezing, the first tendency of the said articles is to discharge or have squeezed therefrom their water contents, which, due to the position of the screen and the article being squeezed within the screen, will flow downwardly toward the apertures 31 in the lower edge of the screen 12, and thence such water will flow into the drain 32 of the tray 28, and outwardly through the spout or nozzle 33. This water content, which of course will have the fruit or vegetable flavor therein, may be received in a suitable receptacle if desired, and utilized for various purposes. However, the separation of the pulp of the fruit or vegetables is the primary object of this invention, and in the passage of the articles through the machine, the pulp will be forced through the perforations in the screen 12, and delivered to the main portion of the tray 28, for delivery or deposit into suitable receptacles, the skins, seeds, and other refuse, passing through the discharge nozzle 25. The squeezing operation may be repeated, of course, on articles already squeezed, to extract therefrom all possible pulp or juice. This separation of the water content from the articles, however, is important, and will be appreciated by those skilled in this art.

The operation of the present machine is exceedingly simple and will be readily understood, being briefly described as follows:

Tomatoes or other articles being fed to the machine through the hopper 16, the handle 7 is turned, in turn rotating the shaft 5 and feed screw 18, and thus feeding the articles through the machine, the liquid or water first extracted flowing through the apertures 31 into the drain portion 32 of the tray 28 and out through the discharge nozzle 33.

As the articles progress through the screen 12, the pulp therefrom will be ejected through the perforations in the screen 12, while the skins, rinds, seeds or other refuse will continue through the machine and out through the discharge nozzle 25 provided therefor.

The position of the feed screw will, of course, be varied by adjustment of the sleeve 21 for the different types or grades of articles to be operated upon.

I believe that my present machine, as above described, is novel, and I have therefore claimed the same herein.

While I have necessarily described my present invention somewhat in detail, it will be appreciated that I may vary the size, shape and arrangement of parts within reasonably wide limits without departing from the spirit of the invention.

My invention is further described and defined in the form of claims as follows:

1. In a machine of the kind described, a conical screen having a feed opening in its upper surface, a shaft, a feed screw rotatable within said screen and mounted on said shaft, a sleeve surrounding said shaft and having a plurality of notches in one end thereof, a lug on said shaft adapted to engage one of said notches to predetermine the position of the feed screw with relation to said screen.

2. In a machine of the kind described, a conical screen having a feed opening in its upper surface, a shaft, a feed screw rotatable within said screen and mounted on said shaft, a sleeve surrounding said shaft and having a plurality of notches of varying depth in one end thereof, a lug on said shaft adapted to engage one of said notches to predetermine the position of the feed screw with relation to said screen.

3. In a machine of the kind described, a conical screen having a feed opening in its upper surface, a shaft, a feed screw rotatable within said screen and mounted on said shaft, a sleeve surrounding said shaft and having a plurality of notches of varying depth in one end thereof, a lug on said shaft adapted to engage one of said notches to predetermine the position of the feed screw with relation to said screen, and means to separate the liquid content from the articles fed to said machine.

4. In a machine of the kind described, a conical screen having a feed opening in its upper surface, a shaft, a feed screw rotatable within said screen and mounted on said shaft, a sleeve surrounding said shaft and having a plurality of notches of varying depth in one end thereof, a lug on said shaft adapted to engage one of said notches to predetermine the position of the feed screw with relation to said screen, a tray positioned below said screen, and means on said screen and said tray to separate the liquid content from the articles fed to the machine.

5. In a machine of the kind described, a conical screen having a feed opening in its upper surface, a shaft, a feed screw rotatable within said screen and mounted on said shaft, a sleeve surrounding said shaft and having a plurality of notches of varying depth in one end thereof, a lug on said shaft adapted to engage one of said notches to predetermine the position of the feed screw with relation to said screen, a tray positioned below said screen, means on said screen and said tray to separate the liquid content from the articles fed to the machine, said screen being inclined upwardly toward its discharge opening.

6. A machine of the kind described, comprising a bracket having a recess in its upper end, a shaft extending through said recess, a handle secured to said shaft, a plate affixed to the upper end of said bracket, a plurality of lips on said plate, a cylindrical screen, a plurality of lugs on one end of said screen adapted to engage with the lips on said plate to attach the screen thereto, a feed screw mounted on said shaft and within said screen, a lug on said shaft, and a sleeve surrounding said shaft and having notches in one end thereof, said lug and said notches cooperating to adjust said feed screw in fixed predetermined relation with said screen.

In testimony whereof, I have signed my name to this specification.

NICHOLAS ARCHIDIACANO.